(12) United States Patent
Peled et al.

(10) Patent No.: US 8,982,340 B2
(45) Date of Patent: Mar. 17, 2015

(54) FAST BRILLOUIN OPTICAL TIME DOMAIN ANALYSIS FOR DYNAMIC SENSING

(71) Applicant: Ramot at Tel-Aviv University Ltd., Ramat Aviv (IL)

(72) Inventors: Yair Peled, Kfar Ruth (IL); Moshe Tur, Tel Aviv (IL)

(73) Assignee: Ramot at Tel-Aviv University Ltd., Ramat Aviv (IL)

( * ) Notice: Subject to any disclaimer, the term of this patent is extended or adjusted under 35 U.S.C. 154(b) by 0 days.

(21) Appl. No.: 13/947,113

(22) Filed: Jul. 22, 2013

(65) Prior Publication Data

US 2014/0022536 A1 Jan. 23, 2014

Related U.S. Application Data

(60) Provisional application No. 61/674,006, filed on Jul. 20, 2012.

(51) Int. Cl.
*G01M 11/00* (2006.01)
(52) U.S. Cl.
CPC .......... *G01M 11/3172* (2013.01); *G01M 11/39* (2013.01)
USPC ........................................................ 356/73.1
(58) Field of Classification Search
CPC .......................... G01M 11/3172; G01M 11/39
USPC ............................. 356/73.1; 398/9–38
See application file for complete search history.

(56) References Cited

U.S. PATENT DOCUMENTS

| | | | | |
|---|---|---|---|---|
| 7,948,614 | B2 * | 5/2011 | Hotate et al. | 356/73.1 |
| 8,144,314 | B2 * | 3/2012 | Yamamoto | 356/73.1 |
| 8,493,556 | B2 * | 7/2013 | Li et al. | 356/73.1 |
| 8,699,009 | B2 * | 4/2014 | Li et al. | 356/33 |
| 2006/0018586 | A1 * | 1/2006 | Kishida | 385/12 |
| 2006/0285850 | A1 * | 12/2006 | Colpitts et al. | 398/108 |
| 2010/0128257 | A1 * | 5/2010 | Yamamoto et al. | 356/73.1 |
| 2013/0308682 | A1 * | 11/2013 | Tur et al. | 374/161 |

* cited by examiner

*Primary Examiner* — Sang Nguyen
(74) *Attorney, Agent, or Firm* — Pearl Cohen Zedek Latzer Baratz LLP

(57) ABSTRACT

A method for conducting fast Brillouin optical time domain analysis for dynamic sensing of optical fibers is provided herein. The method includes the following stages: injecting a pump pulse signal into a first end of an optical fiber and a probe signal into a second end of the optical fiber, wherein the probe and the pump pulse signals exhibit a frequency difference between them that is appropriate for an occurrence of a Brillouin effect; alternating the frequency of either the probe or the pulse signals, so as the alternated signal exhibits a series of signal sections, each signal section having a predefined common duration and a different frequency; measuring the Brillouin probe gain for each one of the alternating frequencies; and extracting physical properties of the optical fiber throughout its length at sample points associated with the sampled time and the frequencies, based on the measured Brillouin probe gain.

27 Claims, 2 Drawing Sheets

FAST BRILLOUIN OPTICAL TIME DOMAIN ANALYSIS FOR DYNAMIC SENSING

CROSS REFERENCE TO RELATED APPLICATIONS

The present patent application claims the benefit of U.S. Provisional Patent Application No. 61/674,006, filed on Jul. 20, 2012, which is incorporated herein by reference in its entirety.

FIELD OF THE INVENTION

The present invention relates to sensing Brillouin scattering in optical fibers, and more particularly, to a dynamic Brillouin sensing.

BACKGROUND OF THE INVENTION

The use of stimulated Brillouin scattering (SBS) for fiber optic strain and temperature distributed sensors is well known in the art. One of the most widely used approaches is the classical method of Brillouin optical time-domain analysis technique (BOTDA), where a pump pulse interacts with a counter propagating probe wave. Strain and temperature information is deduced from the local Brillouin gain spectrum (BGS), which is measured by scanning the optical frequency of the probe wave.

In order achieve high strain/temperature resolution over a wide dynamic range of these two measurands, the scanned frequency range must be wide (>100 MHz) and of high granularity, resulting in a fairly slow procedure, that often requires multiple scanning to reduce noise. Thus, classical BODTA is currently mainly applied to the static or semi-static measurements.

SUMMARY OF THE INVENTION

According to one aspect of the invention, there is provided a method for conducting fast Brillouin optical time domain analysis for dynamic sensing of optical fibers. The method includes the following stages: injecting a pump pulse signal into a first end of an optical fiber; injecting a probe signal into a second end of an optical fiber, wherein the probe and the pump pulse signals exhibit a frequency difference therebetween that is appropriate for an occurrence of a Brillouin effect, in which the probe signal is amplified by a Brillouin effect, to yield a probe wave whose gain corresponds to matching between the fiber physical properties and the pump-probe waves frequency difference, at each point along the fiber, at any point of time; alternating the frequency of either the probe or the pulse signals, so as the alternated signal exhibits a series of signal sections, each signal section having a predefined common duration and a different frequency; measuring the Brillouin probe gain for each one of the alternating frequencies; and extracting physical properties of the optical fiber throughout its length at sample points associated with the sampled time and the frequencies, based on the measured Brillouin probe gain, to yield a dynamic analysis of the physical properties of the optical fiber.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

The drawings together with the following detailed description make apparent to those skilled in the art how the invention may be embodied in practice.

DETAILED DESCRIPTION OF THE INVENTION

The present invention, in embodiments thereof, suggests generating both the pump and probe waves from the same highly coherent laser by using an electro-optic modulator to create a frequency difference between the pump (directly derived from the laser) and probe (down shifted in frequency from that of the laser by a controllable difference on the order of the BFS~11 GHz). The modulator is normally driven by a relatively slowly sweeping YIG- or VCO-based electronic synthesizer, whose frequency is scanned at a rate on the order of 1 ms per frequency step (or slower), to cover the frequency span of interest (100's of MHz). Instead, we propose the use of an arbitrary waveform generator (AWG). While the pump pulse frequency is maintained at a fixed value, the probe frequency can be changed every $T_{round\_trip}$=1 µs (for a 100 m long fiber).

This very fast change may be obtained by first writing into the deep memory of the AWG a numerical description of 1 µs long sine wave of the first frequency, followed by the numerical description of 1 µs long sine wave of the second frequency, until all $N_{freq}$ frequencies have been recorded. Then, in synchronization with the first pump pulse, the digital to analog output stage of the AWG emits a 1 µs long analog sine wave of the first frequency, followed by a 1 µs long analog sine wave of the second frequency, destined to meet the second pump pulse, and so on and so forth until the last frequency has been launched. This sequence of $N_{freq}$ scans defines a temporal frame of length $T_{frame}=N_{freq}T_{round\_trip}$.

The main characteristics required from the AWG are: (i) wide bandwidth of at least a few hundred MHz to be able to cope with the dynamic range spanned by the varying strain and temperature along the fiber; and (ii) deep enough memory to contain all waveforms representing the planned scan frequencies. While these two requirements are met in full by a few currently available AWGs, it is very difficult to find an AWG which can directly synthesize frequencies around the required center frequency of ~11 GHz. Instead, as will be shown below, frequency up conversion can lift the output of ~1 GHz AWGs to the Brillouin regime. This variant of the BOTDA is referred herein as Fast BOTDA, or F-BOTDA for short.

Figure 1:
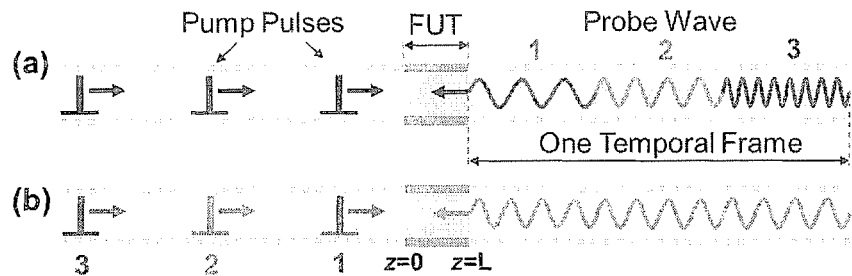
FIG. 1 is a schematic diagram illustrating the probe signal and the pulse signal within the fiber, according to some embodiments of the invention.

FIG. 1 is a schematic diagram illustrating the probe signal and the pulse signal within the fiber, according to some embodiments of the invention. The diagram illustrates an exemplary embodiment of the suggested F-BOTDA fast sweep assembled from three frequencies. Normally, such a sweep includes between 100 and 200 different frequencies. Two possible implementations are shown: in diagram (a) a sequence of fixed frequency pump pulses meets probe waves of different frequencies. In diagram (b) the probe frequency is fixed while the frequency of the pump pulse changes from one pulse to the other.

For averaging and SNR improvement, the process repeats itself for $N_{avg}$ times. Clearly, the same fast scanning idea can be equally implemented by keeping a fixed probe frequency while fast changing the frequency of the pump pulse. In either case, one could perform the $N_{avg}$ averages per frequency before switching to the next frequency. Clearly, this mode is less demanding on the frequency switching speed but compromises the sampling rate of the phenomenon to be sensed. Additionally, the first type of data acquisition allows a more flexible post-processing, e.g., performing different amounts of averaging on different fiber segments.

Figure 2:
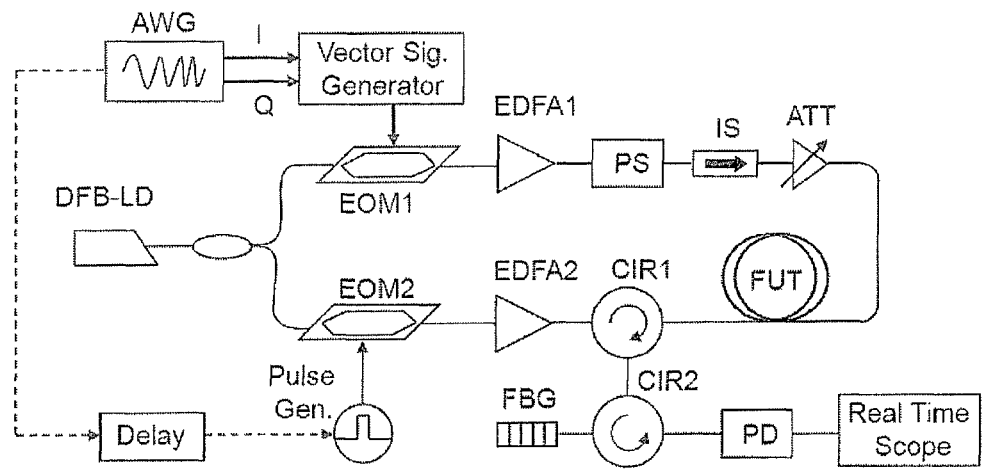
FIG. 2 is schematic block diagram illustrating a system according to some embodiments of the invention.

FIG. 2 is schematic block diagram illustrating an exemplary system according to some embodiments of the invention. The system may include the following components: a first light source configured to inject a pump signal into a first end of an optical fiber; a second light source configured to inject a probe signal into a second end of an optical fiber, wherein the probe and the pump pulse signals exhibit a frequency difference there between that is appropriate for an occurrence of a Brillouin effect, in which the probe signal is amplified by a Brillouin effect, to yield a probe wave whose gain corresponds to matching between the fiber physical properties and the pump-probe waves frequency difference, at each point along the fiber, at any point of time; a microwave signal generator configured to alternate the frequency of either the probe or the pulse signals, so as the alternated signal exhibits a series of signal sections, each signal section having a predefined common duration and a different frequency; a sensor configured to measure the Brillouin probe gain for each one of the alternating frequencies; and a computer processor configured to extract physical properties of the optical fiber throughout its length at sample points associated with the sampled time and the frequencies, based on the measured Brillouin probe gain, to yield a dynamic analysis of the physical properties of the optical fiber.

Figure 3:
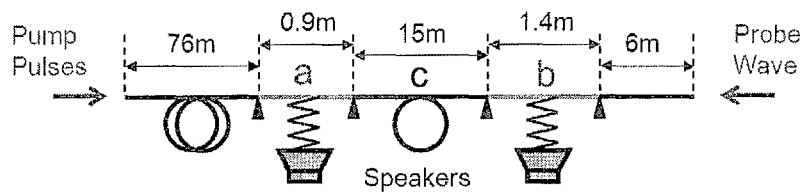
FIG. 3 is schematic block diagram illustrating an aspect of a system according to some embodiments of the invention.

A more detailed configuration of the aforementioned system is detailed below. It should be understood that the suggested implementation is detailed herein by way of example and should not be regarded as limiting the scope of the present invention. A highly coherent 1550 nm DFB laser diode (DFB-LD) is split into pump and probe channels. A complex waveform, of the shape as illustrated in FIG. 1, to be described in more detail below, feeds the probe channel Mach-Zehnder modulator (EOM1), which is biased at its zero transmission point to generate two sidebands, the lower one for the probe wave and the upper one to be discarded later by the fiber Bragg grating (FBG) filter. The EOM1 output is then amplified by an Erbium doped fiber amplifier (EDFA1), optionally scrambled by a polarization scrambler (PS), and launched into one side of the fiber under test (FUT), which is shown in FIG. 3, through an attenuator (ATT). Modulator EOM2 forms a 13 ns pump pulse, which is amplified by EDFA2 and launched into the other side of the FUT through a circulator (CIR1). The Brillouin-amplified probe wave is finally routed to a fast photodiode (PD) by CIR1 and CIR2. A narrow bandwidth fiber Bragg grating (FBG) filters out pump backscattering, as well as the upper sideband generated by EOM1. Finally, the output of the photodiode is sampled at a frequency of $f_{samp}$=1 GSamples/s by a real-time oscilloscope with deep memory.

As shown in FIG. 3, the exemplary 100m FUT comprising five sections of SMF fiber. The two sections of 0.9 m (a) and 1.4 m (b) are mounted on manually stretching stages, making it possible to adjust their static Brillouin frequency shifts. Additionally, audio speakers are physically attached to these two sections in order to induce fast strain variations of various frequencies and magnitudes. Segment (c) is loosed as the rest of the fiber.

Obtained from the lower sideband of the modulator output, the optical frequency of the probe signal is given by $v_{probe}=v_{laser}-f=v_{pump}-f$, where f is the frequency of the RF signal at the modulator input. In standard single mode fibers at 1550 nm, the BFS is around 11 GHz, and quite a wide range of temperature and strain variations can be monitored by scanning the frequency f over a range of a few hundred MHz around 11 GHz with a specified granularity. Our method calls for an essentially instantaneous switching of the scanning frequency. The required fast switching (~1 ns) can be achieved by high-speed arbitrary waveform generators (AWGs), most of which are still limited to frequencies of a few GHz. In this experiment we used a combination of a dual-channel 500 MHz AWG together with a microwave vector signal generator with I/Q inputs to achieve a clean RF modulating signal, having a fast changing frequency, covering up to 1 GHz around 11 GHz.

In order to generate a sequence of signals of frequencies: $\{f_i=f_{start}+(i-1)f_{step}, i=1 \ldots N_{freq}\}$, the microwave signal generator frequency, $f_c$, was set to a fixed value around 11 GHz and the two channels of the AWG, $V_I(t)$ and $V_Q(t)$ were programmed to synthesize cosine and sine waveforms at baseband frequencies $\{(f_i-f_c), i=1 \ldots N_{freq}\}$:

$$V_I(t) = V_0 \sum_{i=1}^{N_{freq}} rect\left(\frac{t}{T_{round\_trip}} + \frac{1}{2} - i\right) \cos[2\pi(f_i - f_c)t]; \quad (1)$$

$$V_Q(t) = V_0 \sum_{i=1}^{N_{freq}} rect\left(\frac{t}{T_{round\_trip}} + \frac{1}{2} - i\right) \sin[2\pi(f_i - f_c)t];$$

A frequency synthesizer with I/Q modulation capabilities mixes its I ($V_I(t)$) and Q($V_Q(t)$) inputs with a high frequency carrier, generated by the synthesizer at frequency $f_c$, to produce a clean RF output of the required form:

$$V_{RF}(t) = \quad (2)$$

$$V_I(t)\cos(2\pi f_c t) - V_Q(t)\sin(2\pi f_c t) = V_0 \sum_{i=1}^{N_{freq}} rect\left(\frac{t}{T_{round\_trip}} + \frac{1}{2} - i\right) \cdot$$

$$[\cos[2\pi(f_i - f_c)t]\cos(2\pi f_c t) - \sin[2\pi(f_i - f_c)t]\sin(2\pi f_c t)] = V_0$$

$$\sum_{i=1}^{N_{freq}} rect\left(\frac{t}{T_{round\_trip}} + \frac{1}{2} - i\right) \cos[2\pi(f_{start} + (i-1)f_{step})t]$$

Ideally, this RF signal instantaneously switches between consecutive frequencies. In practice, the switching speed is limited by the analog bandwidth of the AWG to less than 1 ns (in our case). Unlike a simple RF mixer, the I/Q modulator highly suppresses the carrier and unwanted images.

In this experiment, the probe wave optical frequency was swept between $f_{start}$=10.8 GHz and $f_{end}$=10.998 GHz below that of the optical frequency of the pump, in $N_{freq}$=100 frequency steps of $f_{step}$=2 MHz, the duration of which should be at least $T_{round\_trip}$ long. Due to the technical specifications of the AWG, the duration of each frequency was set to 1.2 μs (instead of 1 μs for the 100 m FUT), which is long enough for a single pump pulse to interrogate a 120 m long fiber. Using $T=1.2$ μs and $N_{freq}=100$ leads to $T_{temporal\_frame}=120$ μs. Thus, the acquisition rate was ~8.3 kHz, enabling the measurement of vibrations as fast as 4 kHz. Polarization considerations may slow this fast sampling rate. Indeed, to mitigate the dependence of the Brillouin gain on the fiber birefringence, some kind of polarization scrambling must be invoked. Switching the pump or probe polarization between two orthogonal states [1] will reduce the sampling speed by half. Random scrambling can also be applied with minimum impact if averaging is used to improve the SNR of the Brillouin signal. The reported measurements were taken without a polarization scrambler. Instead, the polarization of the probe wave was adjusted by a polarization controller (PC) so that both stretched sections (a and b in FIG. 3) experienced the same Brillouin gain.

The measurement ended with one long vector of 50 million samples, taken over 50 ms. For analysis, the sampled vector was segmented into shorter vectors of length $N_{cycle}=T_{round\_trip} \cdot f_{samp}(=1200)$, and then to groups of $N_{freq}$ short vectors each, which could then be stored as an $N_{cycle} \times N_{freq}$ (1200×100) array. Each array, to be referred to later as a temporal frame, holds a complete distance-frequency map of the distributed BGS measurement of the fiber over $N_{freq}$ frequencies and $N_{cycle}$ spatial points. For a measurement carried out along an interval of $T_{measure}$ seconds, $N_{frame}=T_{measure}/(N_{freq} \cdot T_{round\_trip})$ such temporal frames can be assembled into a three dimensional (distance, frequency, time) matrix, $M(N_{cycle}, N_{freq}, N_{frame})$, which contains the time evolution of the BGS of every spatial point along the fiber. A moving average of order $N_{avg}$ along the $N_{frame}$ axis of $M$ can now be used to improve the signal to noise ratio and to accommodate random polarization scrambling.

Figure 4:
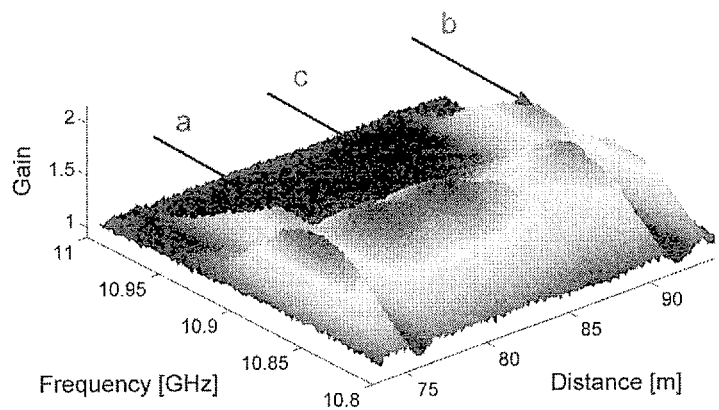
FIGS. 4-6 are graph diagrams illustrating the experimental results according to some embodiments of the invention.

FIG. 4 is a graph illustrating the last 20 m of the 100 m FUT of FIG. 3, having the two sections of length 90 cm (a) and 140 cm (b) statically stretched to the same strain (~800με), corresponding to a BFS of 40 MHz higher than that of the loose fiber. Ten sequential temporal frames were averaged ($N_{avg}=10$, $T_{scan}=1.2$ ms) to produce the figure. No further processing was applied. The observed spatial resolution (~1 m) is that expected from the 13 ns pump pulse. Then, segments a and b were vibrated at 100 Hz and 80 Hz, respectively, using the physically attached audio speakers. An in-between, non-vibrating fixed segment (c) was chosen as a static reference. With a pump pulse repetition rate of 833 kHz, a continuous measurement of the Brillouin signal was taken at a sampling rate of 1 GHz for 50 ms, resulting in a 50M samples vector. With 100 scanning frequencies, the $T_{temporal\_frame}$ was 120 μs long, representing an effective vibrations sampling rate of 8.33 kHz. As described above, the data were arranged in the matrix $M(N_{cycle}, N_{freq}, N_{frame})$, whose three dimensions, respectively represent, distance, frequency and time evolution.

Figure 5:
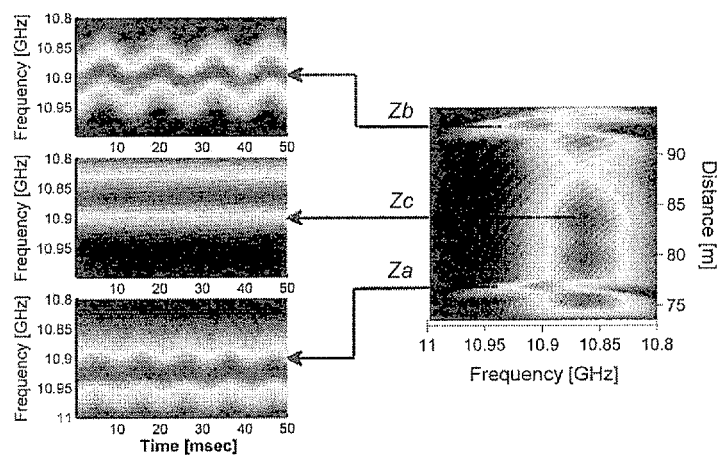

When averaging was required, $N_{avg}$ sequential temporal frames were averaged, effectively reducing the vibrations sampling rate by $N_{avg}$ (833 Hz for $N_{avg}=10$). Slicing $M(\cdot)$ at a certain distance $z_1$ (i.e., along its first dimension, $N_{cycle}$) gives a 2D, frequency-time matrix, which describes the time evolution of the BUS of the spatial resolution cell $z_1$. FIG. 5 shows 3 different such slices along the FUT at $z=z_a$, $z=z_b$ and $z=z_c$. The vibrating dynamic strains, at 100 Hz and 80 Hz are clearly observed at segments a and b, while the BGS of segment c remains static. Quantitative analysis of the raw data of FIG. 5 was achieved by fitting a Lorentzian curve to the measured BGS of each time slot.

Figure 6:
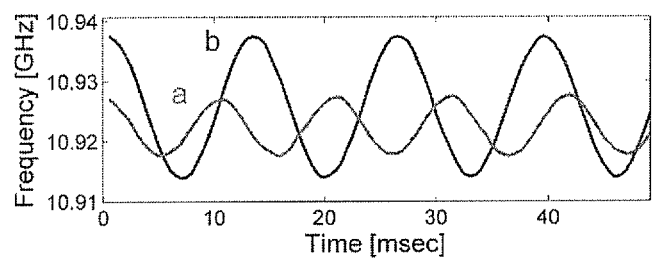

The calculated BGSs peaks, describing the time dependent BFS at segments a and b are shown in FIG. 6.

According to some embodiments of the present invention, a level of power of the pump pulses is selected so as to achieve a high Brillouin gain level of more than 1.1. The exact value of power can be determined over experience and trial and error and may be useful for reaching sufficient gain. According to some embodiments of the present invention, lengthening the pulses may also contribute to a sufficient gain level. For example, the inventors have discovered that extending the pump pulses to be over 10 nsec, achieves a high Brillouin gain level of more than 1.1.

According to some embodiments of the present invention, one or more high spatial resolution methods are employed to enhance the spatial resolution.

Advantageously, some embodiments of the present invention may be useful mainly for short fiber sensors, on the order of a few hundred meters or less. As the fiber gets longer, it is the need for longer averaging, which starts to limit the acquisition rate. With only ten averages, a fairly low standard deviation of 0.25 MHz was obtained, corresponding to ~5με. Since this technique is based on classical BOTDA, most BOTDA recently introduced methods for high spatial resolution can be employed to achieve fast dynamical and distributed Brillouin sensing with high spatial resolution. Finally, although real time implementations of the present invention would involve the recording and processing of large amount of data, modern data acquisition and signal processing circuitry can handle the challenge at a post averaging sampling rate of hundreds of hertz.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for conducting fast Brillouin optical time domain analysis for dynamic sensing of optical fibers, the method comprising:

injecting a pump pulse signal into a first end of an optical fiber;

injecting a probe signal into a second end of an optical fiber, wherein the probe and the pump pulse signals exhibit a frequency difference therebetween that is appropriate for an occurrence of a Brillouin effect, in which the probe signal is amplified by a Brillouin effect, to yield a probe wave whose gain corresponds to matching between the fiber physical properties and the pump-probe waves frequency difference, at each point along the fiber, at any point of time;

alternating the frequency of either the probe or the pump signals, so as the alternated signal exhibits a series of signal sections, each signal section having a predefined common duration and a different frequency;

measuring the Brillouin probe gain for each one of the alternating frequencies;

extracting, by a computer processor, physical properties of the optical fiber throughout its length at sample points associated with the sampled time and the frequencies, based on the measured Brillouin probe gain, to yield a dynamic analysis of the physical properties of the optical fiber; and repeating the alternating with an identical series of signal sections, wherein the measuring is further repeated for each respective alternating frequency and averaged, so that the extracting is applied to averaged Brillouin probe gain, for improving the signal to noise ratio.

2. The method according to claim 1, wherein the predefined common duration equals to one or more round trips of the signals along the optical fiber.

3. The method according to claim 1, wherein the frequencies in the series of signal sections in the alternating signal are selected such that a predefined range of Brillouin frequency shifts (BFS) caused by a range of strains and temperatures is covered by this measurement.

4. The method according to claim 1, wherein the alternating signal is the probe signal.

5. The method according to claim 1, wherein the alternating signal is the pump signal.

6. The method according to claim 1, wherein the extracted physical properties of the optical fiber comprises at least one of: strain on the optical fiber, and temperature of the optical fiber.

7. The method according to claim 1, wherein the alternating frequencies are being generated by an arbitrary waveform generator (AWG).

8. The method according to claim 1, wherein the measuring is repeated sufficiently fast so that the optical fiber is sampled throughout its length at a frequency of over 100 Hz.

9. The method according to claim 1, wherein the extracting is usable to evaluate dynamic structural changes to a structure to which the optical fiber is attached thereto, or planted therein.

10. The method according to claim 1, a level of power of the pump pulses is selected so as to achieve a high Brillouin gain level of more than 1.1.

11. The method according to claim 1, wherein the pump pulses are longer than 10 nsec in order to achieve a high Brillouin gain level of more than 1.1.

12. The method according to claim 1, wherein one or more high spatial resolution methods are employed to enhance the spatial resolution.

13. The method according to claim 1, wherein the method is usable for sensing temperature levels along the fiber.

14. The method according to claim 1, wherein the method is usable for sensing strain levels along the fiber.

15. A system for conducting fast Brillouin optical time domain analysis for dynamic sensing of optical fibers, the system comprising:
a first light source configured to inject a pump signal into a first end of an optical fiber;
a second light source configured to inject a probe signal into a second end of an optical fiber, wherein the probe and the pump signals exhibit a frequency difference there between that is appropriate for an occurrence of a Brillouin effect, in which the probe signal is amplified by a Brillouin effect, to yield a probe wave whose gain corresponds to matching between the fiber physical properties and the pump-probe waves frequency difference, at each point along the fiber, at any point of time;
a signal generator to generate the alternation frequency of either the probe or the pulse signals, so as the alternated signal exhibits a series of signal sections, each signal section having a predefined duration and a different frequency;
a sensor configured to measure the Brillouin probe gain for each one of the alternating frequencies; and
a computer processor configured to extract physical properties of the optical fiber throughout its length at sample points associated with the sampled time and the frequencies, based on the measured Brillouin probe gain, to yield a dynamic analysis of the physical properties of the optical fiber,
wherein the alternating is repeated with an identical series of signal sections, and wherein the measuring is further repeated for each respective alternating frequency and averaged, so that the extracting is applied to averaged Brillouin probe gain, for improving signal to noise ratio.

16. The system according to claim 15, wherein the predefined common duration equals to one or more round trips of the signals along the optical fiber.

17. The system according to claim 15, wherein dynamic analysis of the physical properties of the optical fiber is carried out by a hardware processor configured for computational intense computations.

18. The system according to claim 15, wherein the frequencies in the series of signal sections in the alternating signal are selected such that each frequency difference exhibits a different Brillion gain and at a different point along the optical fiber.

19. The system according to claim 15, wherein the alternating signal is the probe signal.

20. The system according to claim 15, wherein the alternating signal is the pump signal.

21. The system according to claim 15, wherein the extracted physical properties of the optical fiber comprises at least one of: strain on the optical fiber, and temperature of the optical fiber.

22. The system according to claim 15, wherein the signal generator is an arbitrary waveform generator (AWG).

23. The system according to claim 15, wherein the measuring is repeated sufficiently fast so that the optical fiber is sampled throughout its length at a frequency of over 100 Hz.

24. The system according to claim 15, wherein the system is usable to evaluate dynamic structural changes to a structure to which the optical fiber is attached.

25. The system according to claim 15, wherein a level of power of the pump pulses is selected so as to achieve a high Brillouin gain level of more than 1.1.

26. The system according to claim 15, wherein the pump pulses are longer than 10 nsec in order to achieve a high Brillouin gain level of more than 1.1.

27. The system according to claim 15, wherein one or more high spatial resolution methods are employed to enhance the spatial resolution.

* * * * *